Sept. 13, 1955      G. W. PACKER      2,717,791
LINKAGE ADJUSTMENT FOR BRAKES
Filed April 23, 1952
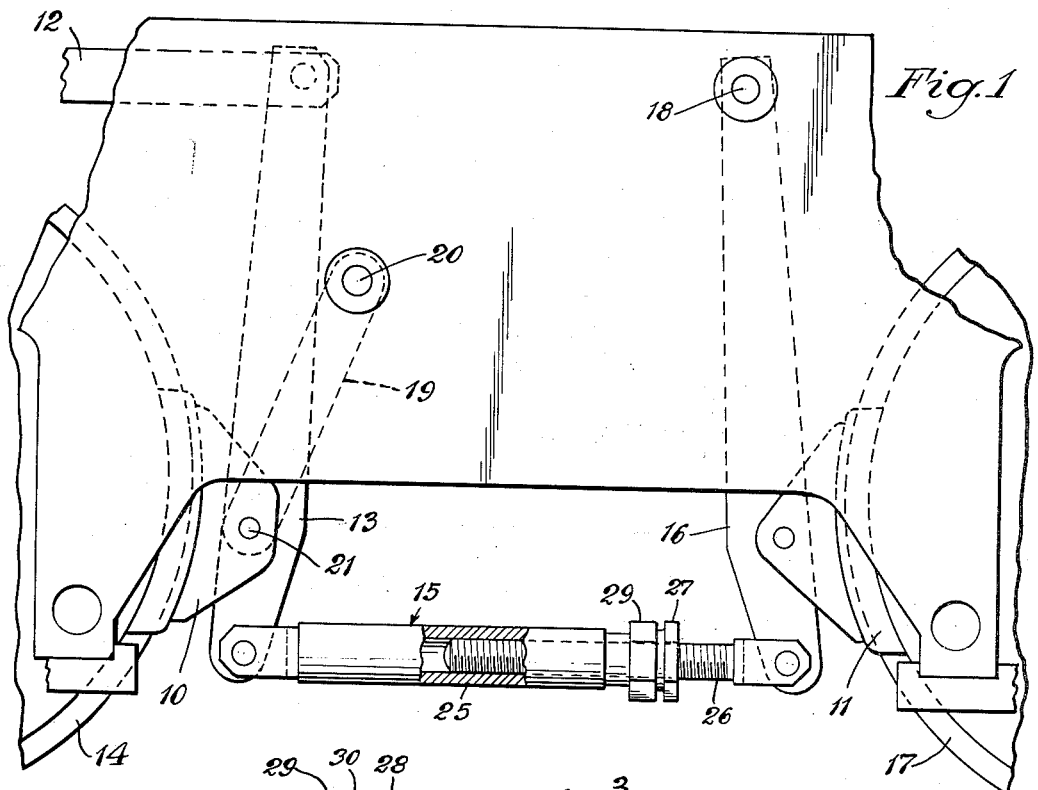
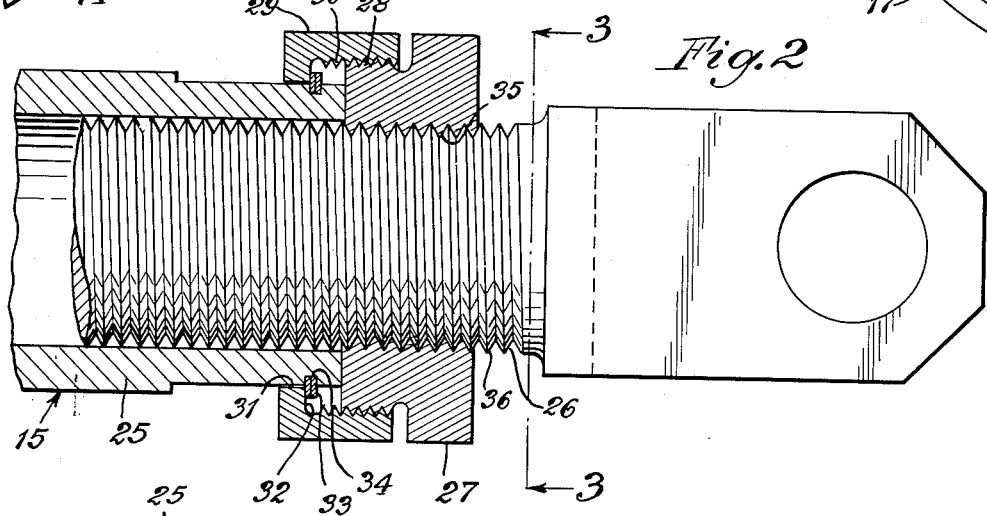
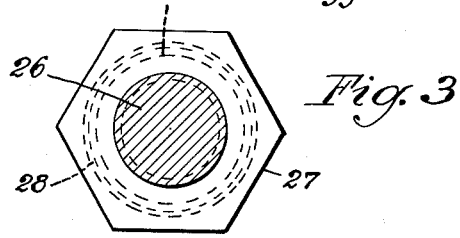
Inventor
Glenn W. Packer
by Murray A. Gleeson
Attorney 
United States Patent Office 2,717,791  
Patented Sept. 13, 1955

2,717,791

LINKAGE ADJUSTMENT FOR BRAKES

Glenn W. Packer, Chicago, Ill., assignor to Goodman Manufacturing Company, Chicago, Ill., a corporation of Illinois Application April 23, 1952, Serial No. 283,861

4 Claims. (Cl. 287—62)

This invention relates to improvements in locomotive brake adjustment linkage and has for its principal object to provide a simple and readily adjustable link especially useful for locomotive brakes, although not limited to such use.

The invention will be understood from the following description and the accompanying drawing, in which:

Figure 1 is a fragmentary side view of a locomotive showing one embodiment of my adjustable link applied thereto, with parts shown in section;

Figure 2 is an enlarged detail section of the adjusting means;

Figure 3 is a section taken on line 3—3 of Figure 2, but drawn to a smaller scale.

In the embodiment of the invention illustrated in the drawing, the same is shown as applied to a locomotive brake linkage of conventional arrangement for actuating a pair of brake shoes 10 and 11 simultaneously controlled from a rod 12. The control rod 12 is pivoted to the upper end of a generally upright link 13. One brake shoe 10 is pivotally connected to link 13 near the lower end thereof, in position to engage one of the locomotive wheels 14. The extreme lower end of link 13 has a link 15 pivotally connected thereto, which is generally horizontal and is pivotally connected at its opposite end to a generally upright link 16. The second brake shoe 11 is pivotally connected to the link 16 near the lower end of the latter, in position for engagement with a second wheel 17. The upper end of the link 16 may be pivotally connected at 18 to the main frame of the locomotive. An auxiliary supporting link 19 may also be provided as usual, pivoted at 20 to the main frame, and at 21 to the brake shoe.

In the brake shoe linkages heretofore in use, the link 15 is commonly provided with means in the nature of a turnbuckle or the like, for adjusting its length so as to compensate for wear on the brake shoes. In the device of the present invention, the adjusting means consists of a hollow tube 25 at one end of the link 15, and a threaded stem 26 at the other end of the link, which is slidably fitted in the open end of said tube for telescopic adjustment relative to the latter.

An adjusting nut 27 is threaded on the stem 26. Said adjusting nut has a polygonal gripping surface herein hexagonal in shape, and a reduced thread portion 28 projecting toward the tube 25 engaged with interior threads 30 of a lock nut 29. In the preferred form shown, said lock nut is of the same peripheral shape and size as the adjusting nut 27 so that both nuts can be manipulated by a wrench of the same size.

The threaded portion 28 of the lock nut 29 is of substantially greater diameter than the exterior of the tube 25 but terminates in a reduced bore 31 to form a shoulder 32 within said lock nut. The threads 28, 30 engaging lock nut 29 on the adjusting nut 27 preferably are finer or of less lead than the threads 35, 36 connecting the adjusting nut with stem 26 so as to insure effective locking action of the lock nut.

A retaining ring 33 is disposed in an annular groove 34 surrounding the tube 25 adjacent its outer end, in position to be engaged by the shoulder 32 of the lock nut. The retaining ring is detachably mounted in the groove 34 in the form shown herein, said retaining ring consisting of a coil of flat spring metal of the type commercially known as a "Spirolox" assembly ring, which can be readily detached by expanding the coils of the ring when desired.

The use and operation of the adjusting means is as follows:

When the parts are in locked position shown in Figure 1, the lock nut 29 is screwed toward the adjusting nut 27 so as to draw the extreme end of the tube 25 into frictional engagement with the abutting end of said adjusting nut under sufficient tension to hold the adjusting nut against rotation relative to the stem 26. The lock nut 29 is loosened to permit readjustment of nut 27 by backing said lock nut away from the adjusting nut 27. This relieves the frictional engagement between the end of the tube 25 and the adjacent end of the adjusting nut 27. The adjusting nut is screwed to the desired position of adjustment by spanning both nuts with the same wrench. The lock nut is thus maintained in uniformly unlocked relation to the adjusting nut, until the latter reaches its desired position, whereupon the lock nut can then be retightened to lock the parts against rotation by applying the wrench to the lock nut only, and screwing it into locking position toward the adjusting nut.

Although I have shown and described a certain embodiment of my invention, it will be understood that I do not wish to be limited to the exact construction shown and described, but that various changes and modifications may be made without departing from the spirit and scope of the invention as defined in the appended claims.

I claim:

1. In an adjustable linkage for brake shoes and the like comprising a link having a hollow tube at one end and an externally threaded stem at the other end slidably mounted in the open end of said tube for telescopic adjustment relative to the tube to adjust the effective overall length of the link to compensate for wear on the brake shoes, the improvement comprising a stop means adjacent the open end of said tube, an adjusting nut threaded on said stem adjacent the tube end, said nut having a reduced outer threaded portion projecting toward the tube for endwise frictional engagement therewith, a lock nut having an internal shoulder on one end and internal threads on the opposite end carried by said tube with said shoulder abutting against said stop means, the reduced outer threaded portion of said adjusting nut threadably engaged by the internal threads of said lock nut to draw the end of said tube into said frictional engagement with the adjusting nut to lock the adjusting nut against rotation relative to the stem.

2. The link defined in claim 1 wherein said lock nut and said adjusting nut are of the same peripheral shape and size whereby both of said nuts may be spanned and manipulate selectively or simultaneously by a single wrench of the same size.

3. The link defined in claim 1 wherein the external threads of the adjusting nut and the internal threads of the lock nut are finer than the external threads of the stem and internal threads of the adjusting nut to insure efficient locking action of the lock nut.

4. The link defined in claim 1 wherein the stop means comprises an annular groove in said open end of the tube and a spring ring detachably disposed in said groove and extending radially outwardly therefrom.

References Cited in the file of this patent

UNITED STATES PATENTS

| | | |
|---|---|---|
| 1,072,425 | Candee | Sept. 9, 1913 |
| 1,372,904 | Regenier | Mar. 9, 1921 |
| 2,447,956 | Morders | Aug. 24, 1948 |

FOREIGN PATENTS

| | | |
|---|---|---|
| 22,044 | Great Britain | June 25, 1908 |